J. M. BOWER.
AUTOMATIC FILM THREADER.
APPLICATION FILED MAY 6, 1916. RENEWED SEPT. 25, 1917.

1,265,039.

Patented May 7, 1918.
3 SHEETS—SHEET 1.

J. M. BOWER.
AUTOMATIC FILM THREADER.
APPLICATION FILED MAY 6, 1916. RENEWED SEPT. 25, 1917.

1,265,039.

Patented May 7, 1918.
3 SHEETS—SHEET 2.

Inventor
J. M. Bower,
By
Attorneys

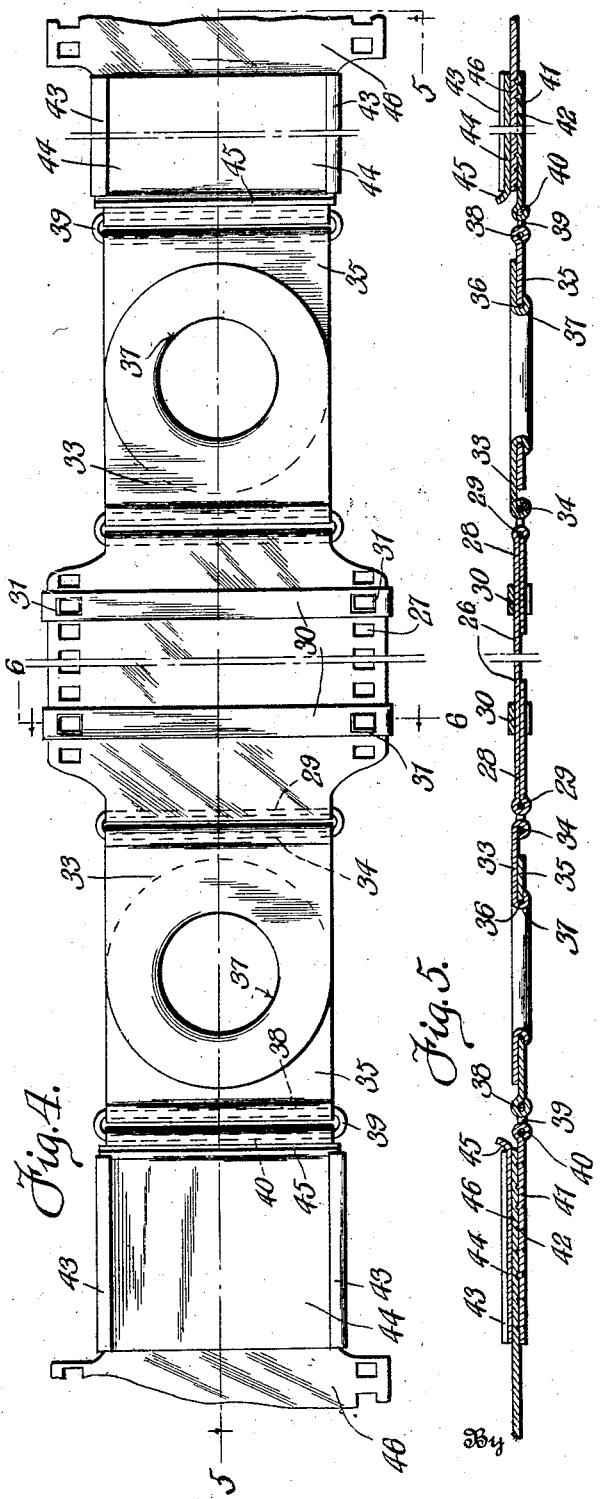

UNITED STATES PATENT OFFICE.

JACOB M. BOWER, OF LANDER, WYOMING, ASSIGNOR OF TWO-FIFTHS TO NEWTON RIPPER, OF LANDER, WYOMING.

AUTOMATIC FILM-THREADER.

1,265,039.  Specification of Letters Patent.  Patented May 7, 1918.

Application filed May 6, 1916, Serial No. 95,871. Renewed September 25, 1917. Serial No. 193,215.

*To all whom it may concern:*

Be it known that I, JACOB M. BOWER, a citizen of the United States, residing at Lander, in the county of Fremont and State of Wyoming, have invented certain new and useful Improvements in Automatic Film-Threaders, of which the following is a specification.

This invention relates to motion picture apparatus and more particularly to the film feeding mechanism thereof, the primary aim of the invention being to provide means whereby a battery of films may be fed without interruption through the projection apparatus, thereby obviating the employment of two projection machines as is now ordinarily done and also obviating the necessity of interrupting the projection of pictures pending the change of reels as is necessary where but a single projection machine is employed.

It is another aim of the invention to provide means for connecting a number of rolls of film in a series in such manner that the following end of a film being projected will be connected with the advancing end of the next adjacent roll of film in the series in such manner that the last-mentioned roll of film will evenly and truly follow the first-mentioned roll of film through the projection apparatus without distortion of the film or likelihood of injury thereto.

Another aim of the invention is to provide novel means for mounting the battery of film reels which means may be readily adjusted so as to successively bring the reels into proper position with relation to the projection apparatus so that the film will be fed evenly and not subjected to lateral strain.

Another aim of the invention is to provide a novel connecting means for the advancing and following ends of the film rolls, which means may be readily connected with the advancing end of a roll and disconnected therefrom so that the reels of a series may be interchanged whenever desired or the program may be varied by the substitution of a new reel or reels or by the addition of more than one reel to the battery or series and this without the necessity of unwinding any of the film rolls.

In the accompanying drawings:—

Fig. 4 is a plan view of one of the connecting devices for the film ends;

Fig. 5 is a vertical longitudinal sectional view on the line 5—5 of Fig. 4;

Fig. 6 is a vertical transverse sectional view on the line 6—6 of Fig. 4;

Fig. 7 is a perspective view of one of the attaching clips for the film, the same being illustrated in its condition prior to application to the film;

Fig. 8 is a perspective view of one of the clips employed in connecting the several reels comprising the battery for rotation in unison.

Figure 2:
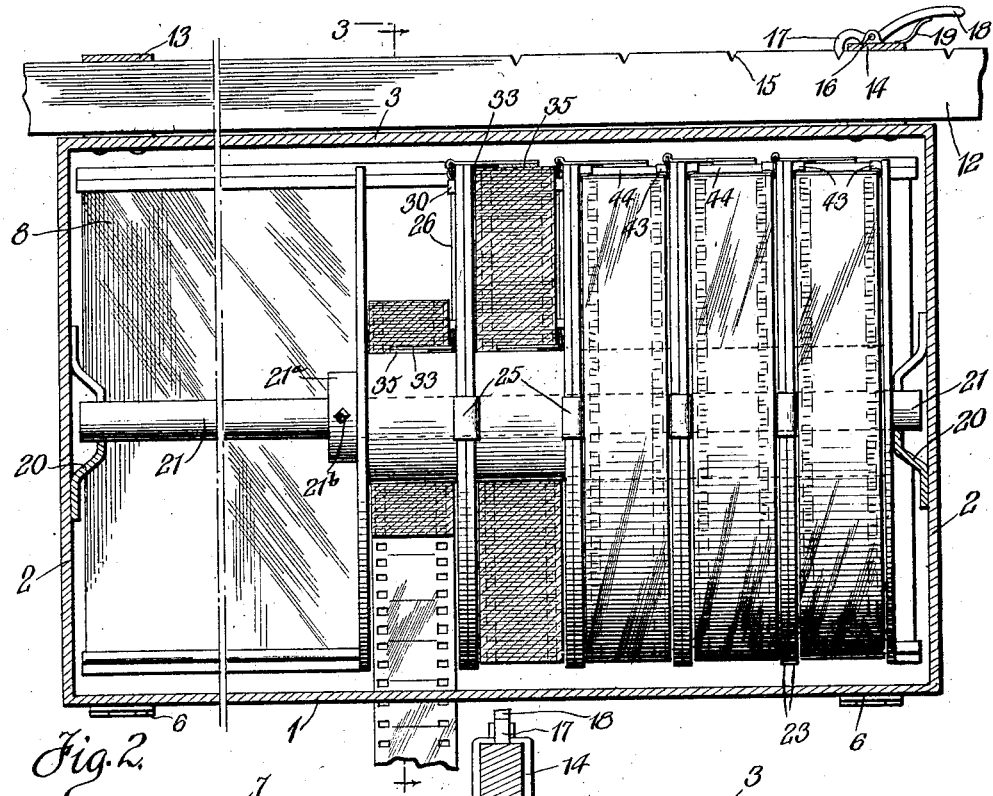
Fig. 2 is a vertical longitudinal sectional view through the device embodying the present invention.

The device embodying the present invention includes a casing which may be of any desired shape but is here illustrated as rectangular in form and this casing comprises a bottom 1, end walls 2, a top 3, a front 4 and a back 5. This latter wall of the casing is hinged at its lower side, as at 6, so that it may be swung downwardly to open position to permit of the introduction and removal of the battery of reels. The back 5 is normally held closed by any suitable latch device indicated by the numeral 7 and it is preferable that the wall be in the nature of a frame in which is mounted a pane of glass or other transparent material indicated by the numeral 8. The bottom 1 of the casing is provided with a slot 9 which extends longitudinally thereof and it is through this slot that the film is led from the film rolls. The casing above described is supported above the film feeding mechanism of the projection apparatus for adjustment transversely with relation thereto so that the several reels may be successively brought into proper position for the feeding of the film through the projection apparatus and while this supporting means may be of any suitable type it is here illustrated as including spaced uprights 10 which are mounted upon the frame of the film feeding mechanism, indicated in general by the numeral 11. A bar 12 extends longitudinally between the upper ends of the uprights 10 and the film casing is provided upon its top 3 at one end with a yoke 13 slidably fitting the said bar 12. The top of the casing is provided at its other end with a similar yoke 14 which also slidably fits the bar 12 and the upper edge of the bar is provided with a series of notches 15 which are spaced apart a distance slightly greater than the width of the film. Pivotally mounted, as at 16, upon the yoke 14 is a detent including a finger 17 designed to engage interchangeably in the notches 15 and at the other side of its pivot the detent is provided with a finger piece 18 which may be depressed for the purpose of moving the finger 17 out of engagement in the notches 15, the detent being, however, normally yieldably held with its finger in position for engagement in the notches by means of a spring 19 secured to the yoke and bearing beneath the finger piece 18. It will now be understood and particularly by reference to Fig. 2 of the drawings that after the film has been fed from one reel the casing is to be moved bodily to the left in said figure to bring the next adjacent reel of the series or battery into the same position formerly occupied by the first-mentioned reel and the engagement of the detent in the notches 15, of course, serves to prevent accidental displacement of the casing after the same has been adjusted to the proper position upon the supporting bar 12 and these notches, furthermore, are so spaced with relation to each other that they determine the adjustment of the casing so that no great care is required of the operator when advancing the casing along the bar 12 so as to properly position the film reels for the feeding of the film through the projection apparatus.

Figure 3:
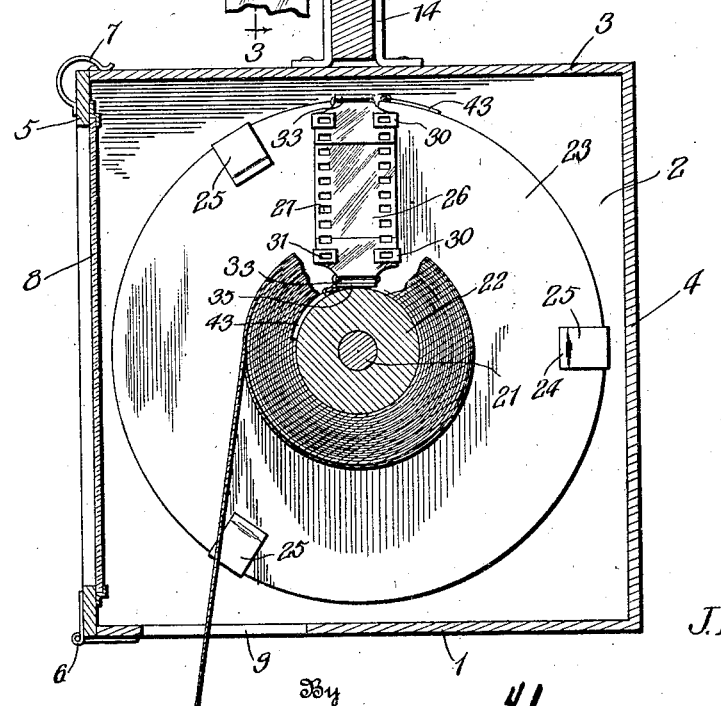
Fig. 3 is a vertical front to rear sectional view on the line 3—3 of Fig. 2.

The end walls 2 of the casing are provided each with an open bearing 20 and these bearings receive the ends of a shaft 21 upon which the reels comprising the battery are supported. The reels are of the ordinary type including a hub 22 and circular side plates 23 and in order that the reels may be connected for rotation in unison and may be held against accidental relative separation, clips, such as shown in Fig. 8 of the drawings, are provided. These clips are preferably formed from resilient sheet metal and have spaced side portions or fingers 24 and a connecting portion 25 and in employing the clips several of the clips are fitted over the contacting sides of adjacent reels in the manner shown in Figs. 2 and 3 of the drawings. It will be understood, of course, that these clips may be readily and quickly applied and removed so that the reels may be conveniently assembled and separated.

While it will be possible to employ a number of different forms of connections between the advancing and following ends of adjacent reels throughout the battery the connection embodying the present invention and shown clearly in Figs. 4, 5 and 6 of the drawings is to be preferred as it permits of the advancing end of one film evenly and truly following the following end of the preceding reel end so that the passage of the film through the projection apparatus will not be interfered with. Each of the connections includes a suitable length of film, indicated by the numeral 26, including the usual series of sprocket openings 27 and the opposite ends of this length of film are folded back upon themselves, as indicated at 28, and each about one side of a connecting loop or link indicated by the numeral 29. In order that the overturned ends of the film may be prevented from running back through the loop and may be readily secured in place, it is preferable that a clip of the form shown in Fig. 7 be provided at each end of the said length of film. This clip comprises a strip 30 of sheet metal provided inwardly of each of its ends with an opening 31 and these openings are designed to register with opposite or corresponding ones of the sprocket openings 27 in the length of film against which the folded over ends lie. The strip 30 is also formed between each of the openings 31 and the corresponding end of the strip with a stamped out projection 32 and in applying the strip to the film ends the end portions of the strip are folded over upon themselves between the openings 31 and projections 32 so that the said projections will engage in the respective openings in the manner clearly shown in Fig. 6 of the drawings. The connection further includes two swivels which are connected at the ends of the length of film 26 and each of these swivels comprises a member 33 having one end bent to engage pivotally about the other side of the loop 29, as indicated in Fig. 4. The other member of each swivel is indicated by the numeral 35 and is provided with an opening 36 receiving the overturned edge portion 37 of the member 33 which affords the swivel connection between the two members. The outer end of the member 35 of each swivel is pivotally connected, as at 38, with one side of an elongated loop or link 39 and pivotally connected to the other side of this loop or link, as at 40, is a plate 41 which constitutes one member of an attaching clip for the end of the picture bearing film. Each of the plates 41 has one face provided with transverse serrations, indicated at 42, or if the said face is otherwise roughened so it may more securely clip the film end and the plate is provided at its opposite sides with overturned flanges 43 slidably receiving the side edges of another gripping plate, indicated by the numeral 44. This last-mentioned plate is provided at one end with an upturned flange 45 which provides for more ready sliding movement of the plate with relation to the plate 41, and by reference to Figs. 4 and 5 of the drawings it will be understood that in connecting a film end with the clip just described the film end is cut away at its opposite sides so as to provide a relatively narrow tongue 46. The plate 44 is then slid in the direction of the adjacent swivel and the tongue 46 is laid upon the corrugated surface of the plate 41 after which the plate 44 is slid back to normal position, as shown in Fig. 5. It will now be understood, particularly by reference to Figs. 2 and 3 of the drawings, that one of the clips last described is to be connected with the following ends of the film roll to be first passed through the projection apparatus, this being done at the time the roll of film is rewound upon the reel. The adjacent swivel member 33 is then turned with relation to the member 35 so that the link 29 will assume a position at right angles to the link 39 and the length of film 26 is then led upwardly beside the inner face of that one of the side plates of the reel which is to be disposed next adjacent the next reel to be fed through the projection apparatus. The length of the film 26 is such that after being arranged in the manner stated and after the film has been wound upon the reel, the other one of the links 29 will be located at the periphery of the reel upon which the first film to be projected is wound. Therefore, the other swivel of the connection may be disposed to extend at right angles to the plane of the length of film 36 and across the periphery of the second roll of film to be projected and the member 35 of this last-mentioned swivel may be turned into alinement with the film wound upon the last-mentioned reel and the clip associated with the last-mentioned reel. It will be understood, of course, that every reel or roll of film to be projected may be provided with one of the connections shown in Figs. 4 and 5 of the drawings, one end of which connection is connected to the inner or following end of the film and that the other end of such connection may then be at any time readily and conveniently connected with the advancing end of any other roll of film.

If desired the shaft 21 may have fitted thereto a collar 21ª secured in place by means of a set screw 21ᵇ, the said collar preventing longitudinal movement of the reels upon the shaft or if desired this collar may be dispensed with and the reels will then automatically shift in unison as the film is unwound therefrom.

Figure 1:
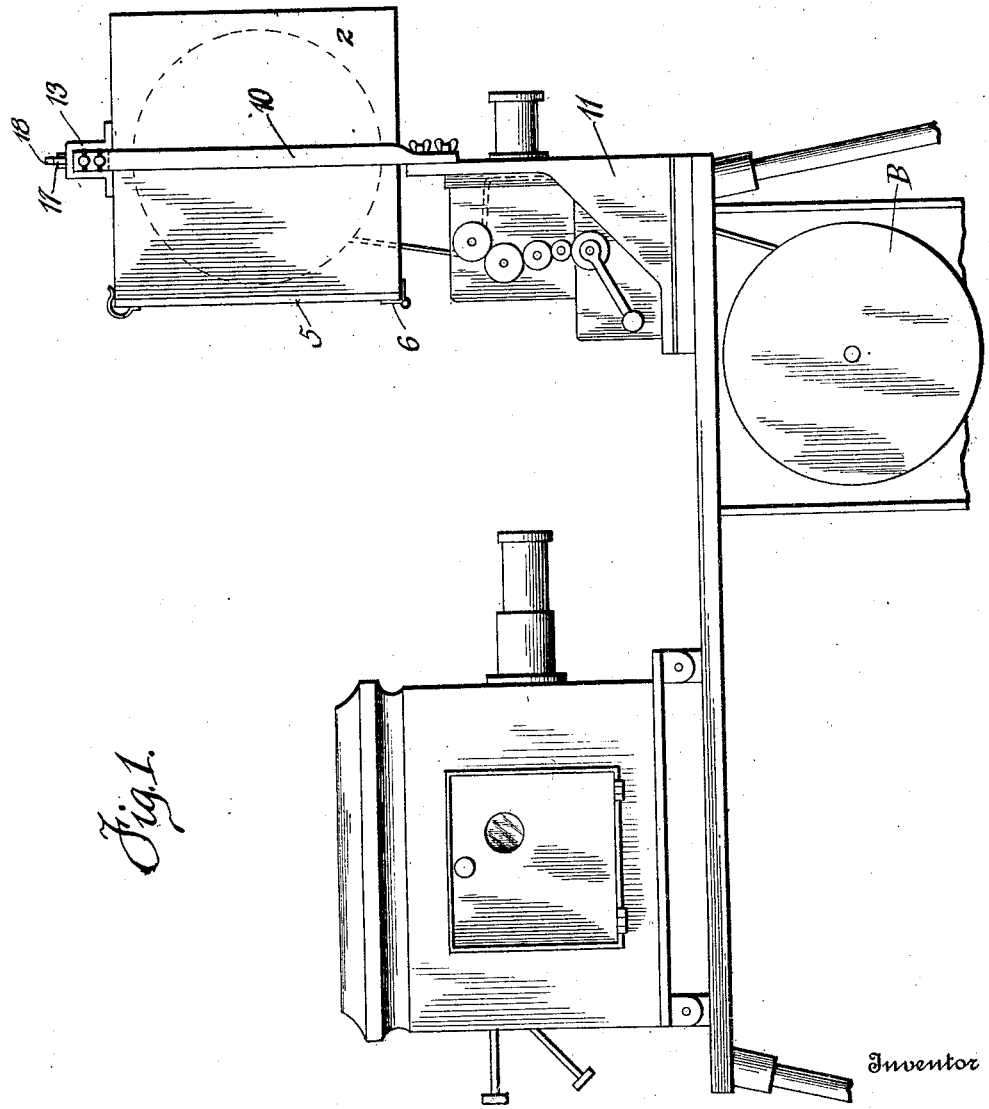
Figure 1 is a side elevation of the device embodying the present invention assembled with a motion picture projection apparatus of the ordinary type.

It is preferable that after the film passes through the projection apparatus, it be wound upon a large or bull reel indicated at B in Fig. 1 of the drawings and from which it may be unwound and the several lengths thereof rewound upon the ordinary size reels, and it will be understood that the reel B may be rotated in any suitable manner as, for example, by means of a slip pulley, spring motor, or, in fact, any other suitable drive mechanism.

Having thus described the invention, what is claimed as new is:

1. In an apparatus of the class described, a reel shaft, a plurality of film reels supported thereby side by side for rotation, a roll of film wound upon each reel, and means applied to and connecting the following end of one film roll with the advancing end of the next adjacent film roll.

2. In an apparatus of the class described, a reel support, a plurality of film reels supported thereby for rotation, a roll of film wound upon each reel, and means connected to the following end of one roll of film and extending beside one of the sides of the reel upon which the said roll is wound and connected at its other end to the advancing end of the next adjacent reel.

3. In an apparatus of the class described, a reel support, a plurality of film reels supported thereby for rotation, a roll of film wound upon each reel, and means for connecting the film rolls detachably connected to the advancing and following ends of adjacent rolls in their unwound condition.

4. In an apparatus of the class described, a reel support, a plurality of film reels supported thereby for rotation, a roll of film wound upon each of the reels, means separably connecting the reels for rotation in unison, and means connecting the following end of one film roll with the advancing end of the next adjacent film roll.

5. In an apparatus of the class described, a reel support, a plurality of film reels supported thereby for rotation, a roll of film wound upon each reel, a clip connected to the following end of one roll of film, a flexible element connected to the said clip and extending radially beside the said roll of film, and a clip connected to the other end of the said flexible element and to the advancing end of the next adjacent roll of film.

6. In an apparatus of the class described, a reel support, a plurality of film reels supported thereby for rotation, a roll of film wound upon each reel, means connecting the following end of one film roll with the advancing end of the next adjacent film roll, and means for supporting the reel support for step by step adjustment.

7. In an apparatus of the class described, a film end connection including a flexible element, film attaching clips, and swivel connection between the ends of the flexible connection and the said clips.

8. In an apparatus of the class described, a film end connection including a flexible element, swivels connected to the ends thereof, and a clip connected to one member of each swivel and constructed to grip a film end.

9. In an apparatus of the class described, a film end connection including a flexible element, swivels connected to the ends thereof, and a clip connected to one member of each swivel and comprising gripping plates arranged for the reception therebetween of a film end.

10. In an apparatus of the class described, a film end connection including a flexible element, swivels connected to the ends thereof, and a clip connected to one member of each swivel and comprising gripping plates arranged for the reception therebetween of a film end, one of the plates being slidable with relation to the other and one of said plates having a roughened surface to contact the surface of the said film end.

In testimony whereof I affix my signature.

JACOB M. BOWER. [L. S.]

Copies of this patent may be obtained for five cents each, by addressing the "Commissioner of Patents, Washington, D. C."